US006811883B2

(12) United States Patent
Lewiner et al.

(10) Patent No.: US 6,811,883 B2
(45) Date of Patent: Nov. 2, 2004

(54) SELF-ADHESIVE DISPLAY FILM

(75) Inventors: Jacques Lewiner, Saint-Cloud (FR); Jean Lionel Georges Martin, Mezzavia (FR)

(73) Assignee: JLJ, Paris (FR)

( * ) Notice: Subject to any disclaimer, the term of this patent is extended or adjusted under 35 U.S.C. 154(b) by 0 days.

(21) Appl. No.: 10/257,840

(22) PCT Filed: Apr. 12, 2001

(86) PCT No.: PCT/FR01/01136

§ 371 (c)(1),
(2), (4) Date: May 6, 2003

(87) PCT Pub. No.: WO01/80205

PCT Pub. Date: Oct. 25, 2001

(65) Prior Publication Data

US 2003/0170461 A1 Sep. 11, 2003

(51) Int. Cl.[7] ......................... B32B 15/08; B32B 27/08; B32B 27/30; B32B 27/32; B32B 27/36

(52) U.S. Cl. ....................... 428/421; 428/212; 428/412; 428/422; 428/480; 428/483; 428/457; 428/458; 428/461; 428/463; 428/520; 428/522; 428/500; 428/343; 428/344; 361/225; 361/212; 361/220

(58) Field of Search ................................ 428/212, 412, 428/421, 422, 480, 483, 457, 458, 461, 463, 500, 520, 522, 343, 344; 361/212, 220, 225

(56) References Cited

U.S. PATENT DOCUMENTS

| | | | | | |
|---|---|---|---|---|---|
| 4,528,232 | A | * | 7/1985 | Cliffe | 428/195.1 |
| 4,861,665 | A | * | 8/1989 | Kasahara | 428/411.1 |
| 5,165,985 | A | * | 11/1992 | Wiste et al. | 428/209 |
| 5,229,910 | A | * | 7/1993 | Kasahara | 361/234 |
| 5,258,214 | A | * | 11/1993 | Cooledge et al. | 428/43 |
| 5,477,784 | A | * | 12/1995 | Floegel | |
| 5,508,086 | A | * | 4/1996 | Kasahara | 428/195.1 |
| 5,638,249 | A | * | 6/1997 | Rubino et al. | |
| 5,899,010 | A | * | 5/1999 | Peck | 40/618 |
| 6,030,002 | A | * | 2/2000 | Charley et al. | 283/81 |
| 6,146,753 | A | * | 11/2000 | Niimi et al. | 428/332 |
| 6,309,750 | B1 | * | 10/2001 | Revill | 428/409 |
| 6,562,428 | B1 | * | 5/2003 | Ohrui | 428/40.1 |
| 6,660,352 | B2 | * | 12/2003 | Hsu et al. | 428/40.1 |
| 2002/0090509 | A1 | * | 7/2002 | Hsu et al. | 428/355 RA |

FOREIGN PATENT DOCUMENTS

| | | | | |
|---|---|---|---|---|
| EP | 0 478 875 | A2 | * | 4/1992 |
| EP | 0 688 844 | | * | 12/1995 |
| GB | 2 231 551 | | * | 11/1990 |
| WO | WO 96/5045 | | * | 2/1996 |

* cited by examiner

*Primary Examiner*—Vivian Chen
(74) *Attorney, Agent, or Firm*—Marshall, Gersetein & Borun LLP

(57) ABSTRACT

Auto-adhesive display film comprising at least one electrically charged, dielectric layer (2). A screen layer (3), which is adapted to form a barrier to the electric field, is fixed to one surface of the dielectric layer (2). This display support does not attract dust particles and is specifically adapted to be printed sheet by sheet.

18 Claims, 1 Drawing Sheet

SELF-ADHESIVE DISPLAY FILM

FIELD OF THE INVENTION

The present invention relates to auto-adhesive display films comprising at least one electrically charged layer, which are adapted to automatically adhere to most smooth surfaces such as window panes, walls, boards or the like.

From among these display films, the invention relates more specifically to those which comprise at least a first dielectric layer, said layer comprising, on the one hand, a first surface and, on the other hand, a second electrically charged surface.

BACKGROUND OF THE INVENTION

Display films of this kind that are currently known generally comprise a layer constituted of a polymer material, preferably polypropylene. As a result of the electrostatic force created by the presence of electric charges which are contained inside this layer, it is possible to instantly adhere the display films to most smooth surfaces.

A drawback of these display films, however, is that the surface of the support layer which is not in contact with the smooth surface has the tendency to attract various particles such as dust, smoke etc . . . , present in the surrounding air. As a consequence, the visual aspect of these supports deteriorates rapidly. Furthermore, these particles may be ionised or may carry electric charges, causing the electrostatic force which adheres the, display support to said smooth surface to be reduced.

A particular aim of the present invention is to remedy those drawbacks.

SUMMARY OF THE INVENTION

To this end, display films of the kind in question are characterized in that a first screen layer, adapted to form a barrier to the electric field, is fixed to at least, the said first surface, of the first dielectric layer.

In preferred embodiments of the invention, use is also made of one or more of the following dispositions:

- the material constituting the first dielectric layer is selected from a polypropylene and a polyethylene terephtalate;
- the material constituting the first dielectric layer is a polymer comprising at least one atom of fluorine per monomer;
- the polymer is selected from polytetrafluoroethylene and polyfluoroethylenepropylene;
- the first screen layer is constituted of a material with a conductivity equal to at least $10^{-10}$ S/cm;
- the material constituting the first screen layer is a metal;
- the material constituting the first screen layer comprises at least one transparent and conductive, metallic oxide;
- the first dielectric layer and the first screen layer are transparent;
- the first screen layer is permanently fixed to the first dielectric layer;
- a removable cover foil is fixed to the second surface of said first dielectric layer, this cover foil comprising at least one second screen layer; this is advantageous in that the display support may be packed into a ream and be used sheet by sheet in a press or a printer, without the stacked supports sticking to one another, like they would in known auto-adhesive display supports;

- the second screen layer is substantially identical to the first screen layer;
- the cover foil comprises at least a second dielectric layer which is fixed to the second screen layer and placed between this second screen layer and the first dielectric layer;
- the material constituting the second dielectric layer is a polymer;
- the first and second dielectric layers are constituted of the same material;
- the first and second dielectric layers have substantially the same thickness;
- the second screen layer is permanently fixed to the second dielectric layer;
- the first screen layer is continuous.

BRIEF DESCRIPTION OF THE DRAWINGS

Further characteristics and advantages of the present invention appear from the following detailed description of several forms of embodiment thereof given by way of non-limiting examples and with reference to the accompanying drawing, wherein.

DETAILED DESCRIPTION

Figure 1:
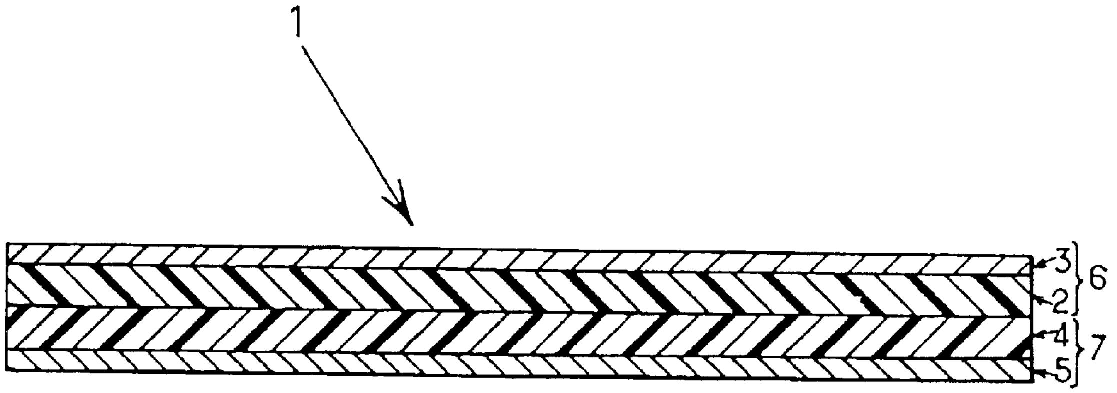
FIG. 1 is a cross sectional view of an example of the display film according to the invention, before it is adhered to a smooth surface.

The display film 1 as illustrated in FIG. 1, before utilisation, comes in the form of a multilayered structure comprising at least:

- a first electrically charged, dielectric layer 2;
- a first screen layer 3, which is constituted of an electrically conducting material, said layer being permanently fixed to a first surface of layer 2;
- a second dielectric layer 4 which is constituted of an electrically insulating material, said layer 4 being fixed in such a way that it is removable, to a second surface of layer 2 which is opposite to the said first surface;
- and a second screen layer 5 which is constituted of an electrical conducting material, said layer being permanently fixed to the surface of layer 4 which is not in contact with layer 2.

Layers 2 and 3 form an auto-adhesive film 6, adapted to automatically adhere to smooth surfaces, while layers 4 and 5 form a removable, protective foil 7.

The material constituting dielectric layer 2 is a plastic material, preferably polypropylene, which has the property of conserving electric charges particularly well. Other materials can also be used, such as polyethylene terephtalate for instance (sold under the name Mylar by Du Pont de Nemours), polytetrafluoroethylene and polyfluoroethylenepropylene.

Layer 2 has a thickness of between, for instance, 1 and 100 $\mu$m.

The material constituting layer 3 preferably has a conductivity of at least $10^{-10}$ S/cm. It is specifically adapted to form a barrier to the electric field, created by the electric charges contained in layer 2.

The material chosen for layer 3 is preferably conductive, and may or may not be transparent. It may be a metal, notably aluminium, but may also be constituted of a conductive polymer, a conductive and transparent metallic oxide, a conductive ink or the like.

Layer 3 has a thickness ranging, for instance, from 10 Å to 10 $\mu$m.

Layer 3 is fixed to layer 2 by glue, by vacuum metallization deposition or by any other methods.

The visible surface of layer 3 is intended for printing on by a standard printing procedure, for example by offset, serigraphy, digital, laser, inkjet, typography, heliography or other methods.

The visible surface of layer 3 may, prior to printing, be specifically treated, in order to improve the adherence of the inks, for instance by ionic or electronic bombardment, or, also, by deposition or coating with a primer.

Figure 2:
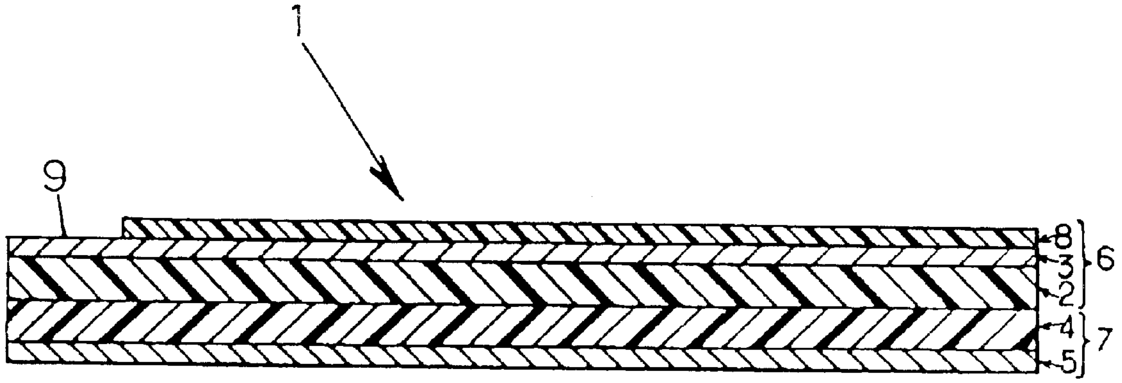
FIG. 2 is a similar view to FIG. 1 of a variation of the invention.

According to a particularly advantageous variation, an additional layer 8, liable to be printed on (FIG. 2) can be fixed to the visible surface of screen layer 3, in which case, it is this additional layer and not layer 3 which is printed on. This additional layer is constituted of a flexible material exhibiting characteristics favourable to printing, particularly in terms of visual aspects such as colours, opaqueness, grain/texture or the like. This material may, for instance, be ink, paper, polyester, polyethylene, or polypropylene or the like.

In this case it may be advantageous to leave a small section 9, of layer 3 uncovered by said additional layer 8, in order to allow an electrical contact to be established on this section.

Layer 8 may also be a layer of material which can be written on using an erasable felt-tip pen, the writing made in this way on layer 8 being erasable by a simple dry wipe.

In the two variations described hereabove, the material used for layer 4 can be any plastic material, for instance a polypropylene, a polyethylene terephtalate (notably sold under the name Mylar by Du Pont de Nemours), a polyester, a PVC or a polyethylene.

In order to obtain an optimal conservation of the electric charges inside layer 2, layer 4 is preferably constituted of the same material as layer 2 and advantageously, has a thickness exactly identical to that of layer 2.

As for layer 5, it is constituted of an electrically conducting material, for instance, the same as that of screen layer 3.

Layer 4 and layer 5 can be fixed one to the other respectively, in the same way as layer 2 is fixed to layer 3.

During the manufacture of the display support, the electric charges are deposited in the material and on the surface of layer 2 which is intended to come in contact with layer 4. These charges are deposited by a standard procedure, for example by the Corona effect, ionic bombardment or electronic bombardment. Means have been foreseen, to connect layer 3 electrically to a predetermined potential, for instance to earth, during this operation.

Once this operation has ended, an auto-adhesive film 6 is obtained, which has the property of being able to spontaneously adhere to any type of plane surface, by the surface of its layer 2 which is not in contact with layer 3, owing to the action of the electrostatic attraction force created by the presence of the electric charges.

This support also exhibits the possibility of being unstuck and repositioned, for instance, on another plane surface.

After the operation of electrostatic charging, the display support according to the invention is temporarily recovered by the protective foil 7 which is constituted of both layers 4 and 5.

Owing to the nature of electrically insulating layer 4, protective layer 7 adheres spontaneously to layer 2. Layers 2 and 4 are then held against one another by the electrostatic attraction force created by the presence of the electric charges contained in layer 2, these charges being trapped in the display support owing to the good insulating and charge retention properties of the material constituting layers 2 and 4.

Such an arrangement of layers 3 and 5 has the advantage of cancelling the external electric field, which in their absence, would be created by the electric charges present in layer 2. The display support can therefore be handled before it is printed on and/or used, without the risk of observing a deterioration of the support which would otherwise result from the attraction of various particles, in particular dust, to dielectric layer 2.

Furthermore, taking account of the nature of layers 3 and 5, the display support according to the invention, can be packed into reams. It can therefore be printed sheet by sheet in a press or printer without any problem since the different supports which make up a ream do not risk sticking together during printing.

According to a variation, layer 4 is itself electrically charged with an opposite charge to that of layer 2. In this way, the auto-adhesive film 6 and the set constituted of layers 4 and 5 can be used separately as auto-adhesive display films.

In this case, it is also possible to place another film similar to layers 2 and 4, between auto-adhesive film 6 and the set of layers 4 and 5.

During storage of the reams, means can be foreseen to electrically connect layers 3 and 5 to each other, which has the effect of improving the retention of electric charges in layer 2 and in facilitating the cancellation of the external electrostatic field.

The auto adhesive film 6 can then be applied by its layer 2, to any smooth surface, once the protective foil 7 has been removed.

According to a particularly advantageous variation (FIG. 1), the material chosen for layer 2 is a transparent material such as polypropylene for instance, and layer 3 is itself made of a conductive and transparent material such as a transparent metallic oxide, for example an indium oxide and/or a tin oxide, a polyanyline, or a composite of polyanyline and methyl polymetacrilate, or even a composite of polyanyline and polycarbonate, in such a way that the display support can be displayed on and seen through a transparent surface (window pane) on which the dielectric layer 2 of film 6 is affixed.

According to another advantageous variation, the auto-adhesive film 6 and the protective foil 7 are linked together through one of their edges. This link facilitates the passage of the display film, according to the invention, in certain printing machines containing rollers for instance. In this way the auto-adhesive film 6 and the protective foil 7 are not likely to go off line while passing through the rollers, if the edge on which they are joined passes through the rollers first. This link can be made by thermosealing over a width of around 1.5 cm. In this case this strip is favourably cut after printing the auto-adhesive film 6.

According to a variation, this link can be assured by a strip of adhesive tape or any other method of this type.

According to another variation, the display support can be constituted of only the auto-adhesive film 6, without the protective foil 7, in which case layer 3 by itself, prevents the accumulation of dust on the printed surface of the display support.

What is claimed:

1. An auto-adhesive display film adapted to automatically adhere to smooth surfaces comprising at least one first dielectric layer, said layer comprising, on the one hand, a first surface, and, on the other hand, a second surface which is electrically charged, the display film being characterized in that a first screen layer, adapted to form a barrier to the electric field, is fixed to at least, said first surface of the first dielectric layer.

2. Display film according to claim 1, wherein material constituting the first dielectric layer is selected from polypropylene and polyethylene terephthalate.

3. Display film according to claim 1, wherein the material constituting the first dielectric layer is a polymer comprising at least one atom of fluorine per monomer.

4. Display film according to claim 3, wherein the polymer is selected from polytetrafluoroethylene and polyfluoroethylenepropylene.

5. Display film according to claim 1, wherein the first screen layer is constituted of a material with a conductivity equal to at least $10^{-10}$ s/cm.

6. Display film according to claim 1, wherein the material constituting the first screen layer is a metal.

7. Display film according to claim 1, wherein the material constituting the first screen layer comprises at least one transparent and conductive metallic oxide.

8. Display film according to claim 1, wherein the material of the first screen layer is selected from a polyaniline, a composite of polyaniline and methyl polymethacrylate, and a composite of polyaniline and polycarbonate.

9. Display film according to claim 1, wherein the first dielectric layer and the first screen layer are transparent.

10. Display film according to claim 1, wherein the first screen layer is permanently fixed to the first dielectric layer.

11. Display film according to claim 1, wherein the cover foil comprises at least a second dielectric layer which is fixed to the second screen layer and placed between this second screen layer and the first dielectric layer.

12. Display film according to claim 11, wherein the material constituting the second dielectric layer is a polymer.

13. Display film according to claim 11, wherein first and second dielectric layers are constituted of the same material.

14. Display film according to claim 11, wherein the first and second dielectric layers have the same thickness.

15. Display film according to claim 11, wherein the second screen layer is permanently fixed to the second dielectric layer.

16. Display film according to claim 1, wherein a removable cover foil is fixed to the second surface of said first dielectric layer, this cover foil comprising at least one second screen layer.

17. Display film according to claim 16. wherein the second screen layer is substantially identical to the first screen layer.

18. Display film according to claim 1, wherein the first screen layer is continuous.

* * * * *